UNITED STATES PATENT OFFICE.

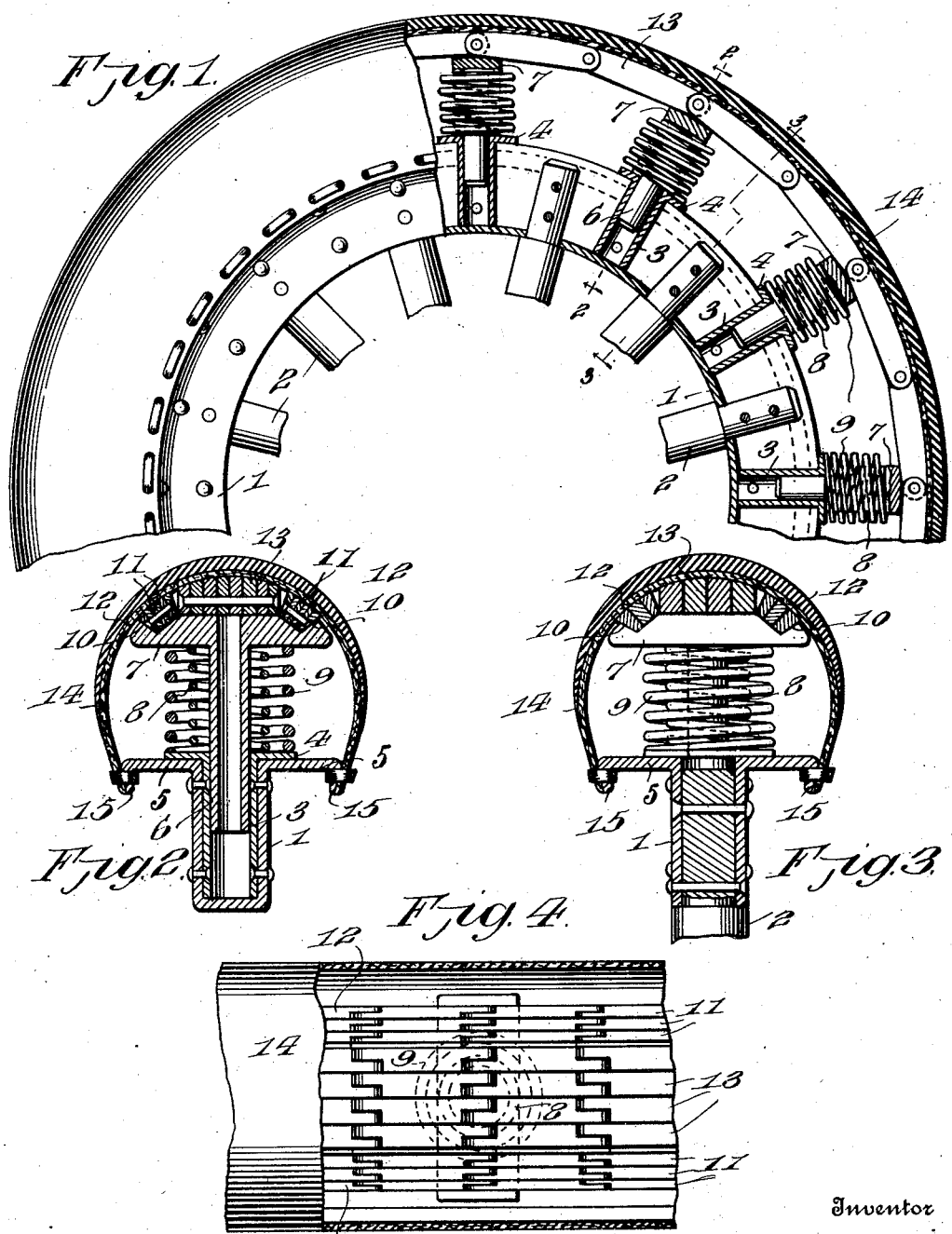

WILLIAM A. BINION, OF NEWARK, NEW YORK.

TIRE.

1,061,807.   Specification of Letters Patent.   Patented May 13, 1913.

Application filed November 22, 1911. Serial No. 661,701.

*To all whom it may concern:*

Be it known that I, WILLIAM A. BINION, a citizen of the United States, residing at Newark, in the county of Wayne and State of New York, have invented new and useful Improvements in Tires, of which the following is a specification.

This invention relates to vehicle wheels and more particularly to tires therefor.

The principal object of the invention is to provide a simple and efficient spring wheel and tire which will take the place of the ordinary pneumatic tire now in common use and which will be durable and economical to operate.

Further objects of this invention will appear as the following specific description is read in connection with the accompanying drawing, which forms a part of this application, and in which:—

Figure 1 is a side elevation partly in section. Fig. 2 is a transverse section on the line 2—2 of Fig. 1. Fig. 3 is a transverse vertical section on the line 3—3 of Fig. 1. Fig. 4 is a top plan view with parts broken away.

Referring more particularly to the drawing, 1 represents the felly of the wheel which is connected to the hub, not shown, by spokes 2 and which is substantially U-shaped in cross section as shown in Figs. 2 and 3. The felly is provided at intermediate points preferably about four or six inches apart with inserted bushings 3 having lateral flanges 4 which overlie the rim 5 integral with the felly 1. These spokes alternate with the bushings, as shown, and enter apertures in the bottom of the felly, being held therein by bolts, or other suitable fastening devices. These bushings have slidably mounted therein suitable plungers 6 having transverse heads 7 against which coil springs 8 and 9 are adapted to abut, the opposite ends of the springs being arranged against the bushing and rim respectively. The head 7 is provided adjacent its ends with V-shaped notches 10 in which lie the links 11, of what may be termed the side chains 12. These chains comprise a plurality of pivotally connected links which have their outer edges conformed to the outline of the tire. Similar chains 13 extend entirely around the wheel and lie upon the top of the head between the chains 12. Covering the chains is a flexible casing 14 constructed of superposed layers of canvas and rubber, or other similar material and having the free edges thereof attached to depending flanges 15 which are formed on the edges of the rim.

The chains 12 and 13 are placed upon the heads of the plungers in such a manner as to hold the springs 8 and 9 under compression at all times so that when one plunger is depressed, under the weight of the vehicle, the remaining plungers will be extended or projected to take up the slack in the chains. The chains 12 not only prevent the chains 13 from slipping upon the head but also prevent lateral strain on the plungers and thereby increase the life of the same and the bushings.

What is claimed is:—

In a device of the class described, the combination with a felly, of bushings mounted therein, plungers slidably mounted in said bushings, springs surrounding said plungers and adapted to normally project the same, heads on the plungers having V-shaped notches adjacent the opposite ends, a plurality of link chains arranged upon the top of the head, a plurality of link chains arranged in the notches at an angle to the first chains, an integral rim on the felly, and a flexible casing surrounding the chains and connected to the rim.

In testimony whereof I affix my signature in presence of two witnesses.

WILLIAM A. BINION.

Witnesses:
 ROY C. BINION,
 F. A. KELLEY.

Copies of this patent may be obtained for five cents each, by addressing the "Commissioner of Patents, Washington, D. C."